United States Patent [19]

Tuson

[11] 4,199,275

[45] Apr. 22, 1980

[54] ARTICULATED COLUMN FOR THE EXPLOITATION OF MARINE BOTTOM RESOURCES, COMPRISING PIPINGS CONNECTABLE BETWEEN THE COLUMN AND ITS BASE

[75] Inventor: Samuel Tuson, Mesnil-le-Roi, France

[73] Assignee: Entreprise d'Equipements Mecaniques et Hydrauliques E.M.H., France

[21] Appl. No.: 918,687

[22] Filed: Jun. 23, 1978

[30] Foreign Application Priority Data

Jul. 1, 1977 [FR] France ................... 77 20391

[51] Int. Cl.² .................... E02B 1/00; E02B 17/00
[52] U.S. Cl. .................... 405/195; 405/203; 405/204
[58] Field of Search ................. 405/195–209, 405/169, 170; 175/7, 10; 166/350, 359, 367

[56] References Cited

U.S. PATENT DOCUMENTS

| | | | |
|---|---|---|---|
| 2,936,592 | 5/1960 | Suderow | 405/203 |
| 3,355,899 | 11/1967 | Koonce et al. | 405/202 |
| 3,603,386 | 9/1971 | Talley | 175/7 X |
| 3,656,307 | 4/1972 | Mott | 405/195 |
| 3,736,756 | 6/1973 | Lloyd | 405/204 |
| 3,987,638 | 10/1976 | Burkhardt et al. | 405/203 |
| 4,126,008 | 11/1978 | Dixon | 175/7 |

FOREIGN PATENT DOCUMENTS 2222907 10/1974 France.
2316522 1/1977 France.

*Primary Examiner*—Dennis L. Taylor
*Attorney, Agent, or Firm*—Steinberg & Blake

[57] ABSTRACT

A device for coupling and uncoupling an emerging articulated column to or from its base installed on the bottom of a body of water, the said column and the said base being provided with piping portions, wherein quick operated connecting-disconnecting means are provided for rapidly interconnecting corresponding portions of the said base pipings and column pipings, respectively, connectable and disconnectable concomitantly with the use or operation of the means of connection and disconnection of the said column to or from the said base.

According to one aspect of the invention, the column is provided with a connecting pedestal substantially cylindrical in shape and adapted to be fitted into an annular socket of the pedestal, and the bundle of pipes pertaining to the column can be connected by screwing to corresponding piping portions converging towards the centre of the socket.

9 Claims, 11 Drawing Figures

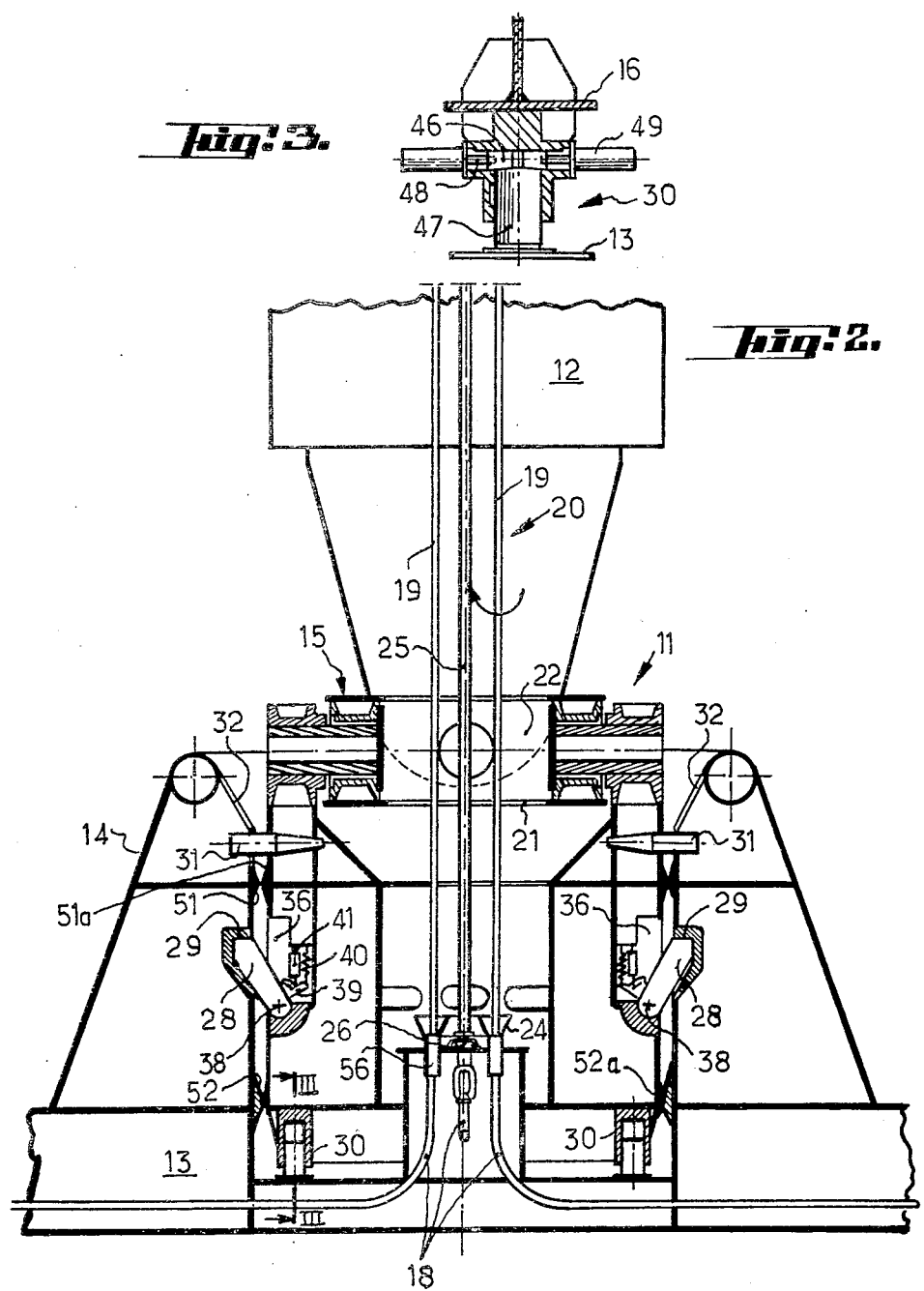

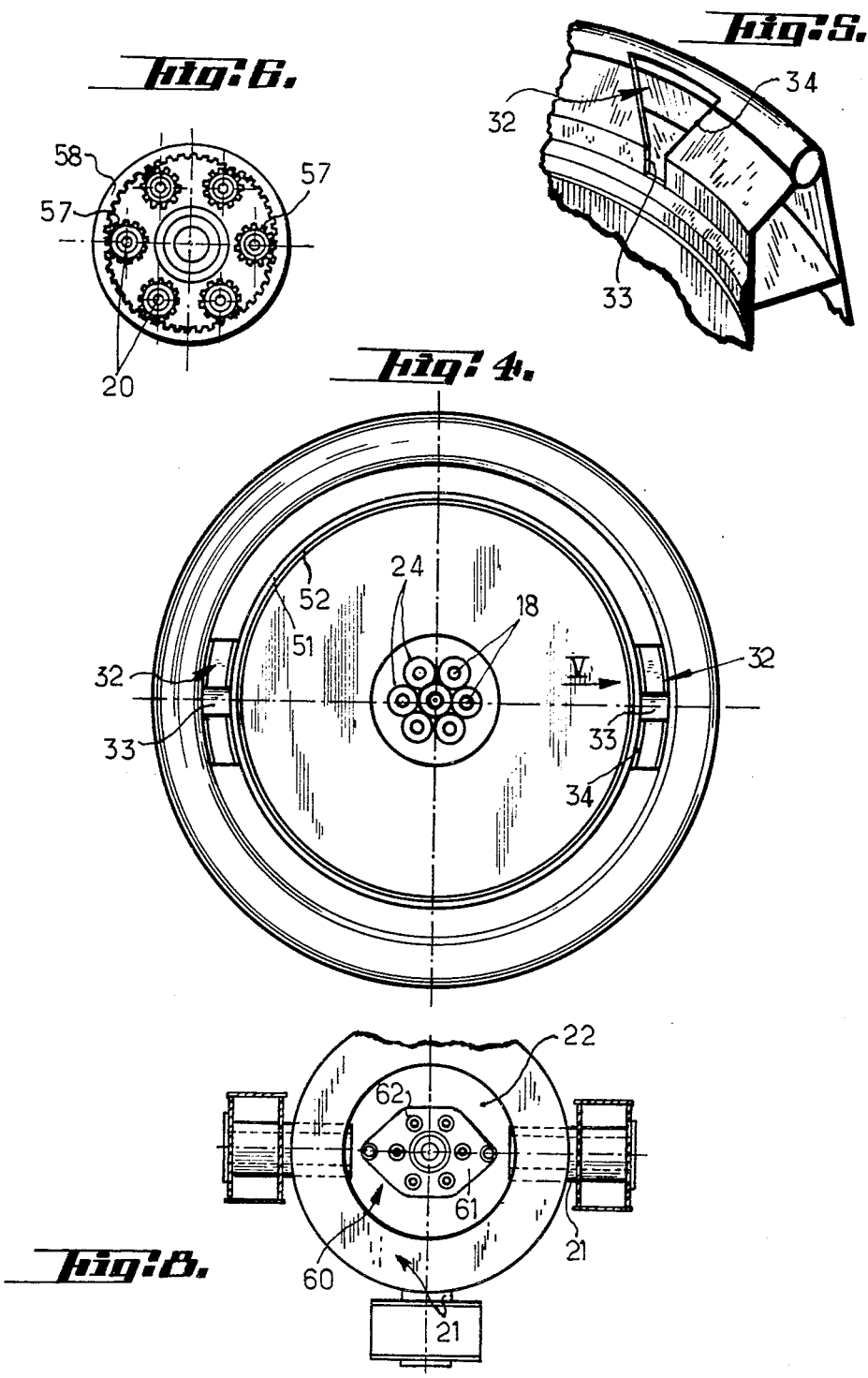

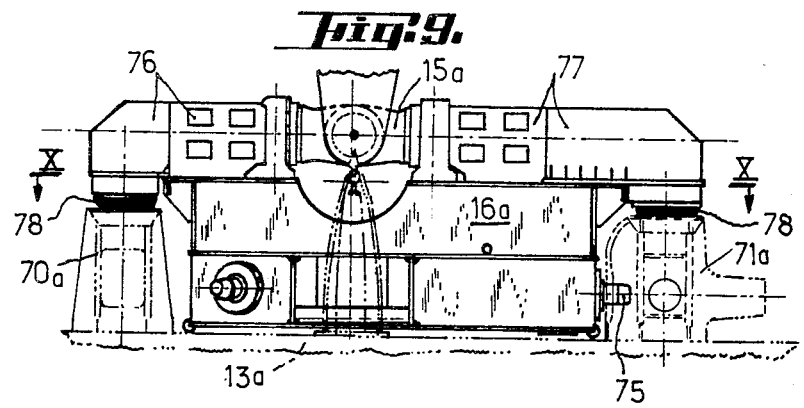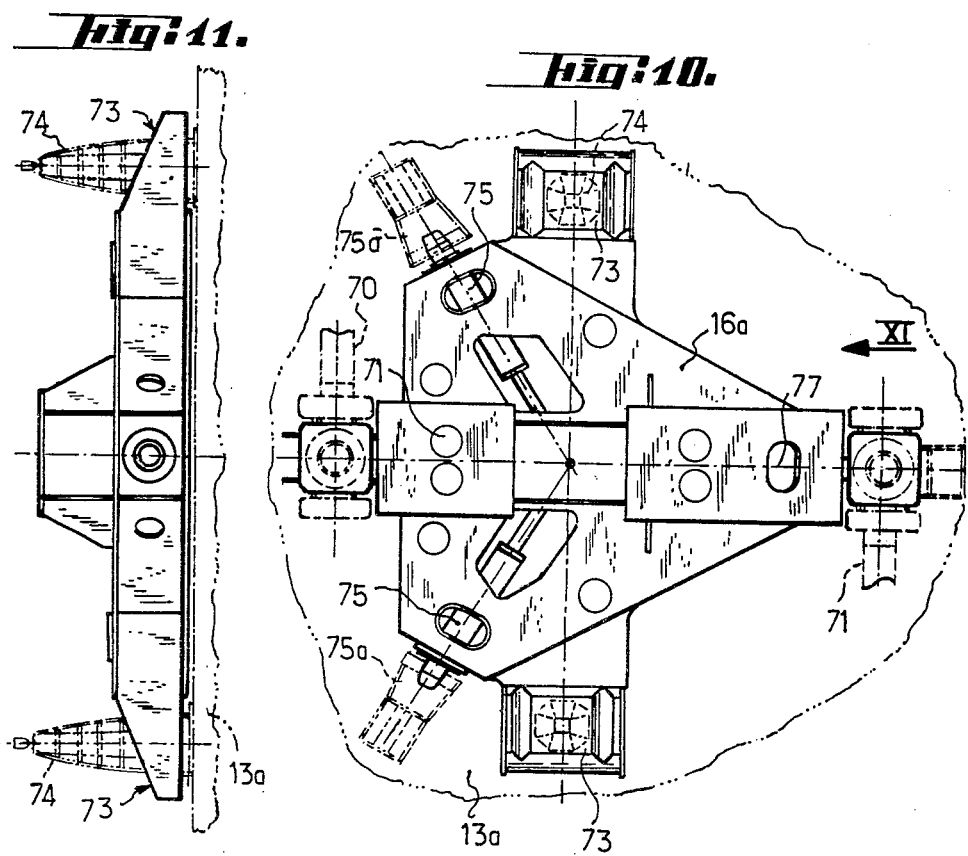

ARTICULATED COLUMN FOR THE EXPLOITATION OF MARINE BOTTOM RESOURCES, COMPRISING PIPINGS CONNECTABLE BETWEEN THE COLUMN AND ITS BASE

The present invention relates to an emerging column articulated with respect to its base installed on the bed of a body of water and serving as a support for a certain number of pipings or lines connected between the water bed and the emerging portion of the column. The invention is more particularly directed at improving the rapidity and reliability of the coupling or uncoupling of a column of such type with respect to its base.

Several types of articulated columns are known which are used particularly and more and more frequently for the exploitation of underwater oil-fields. Such columns may fulfil quite various functions. They may serve as a support for a working platform where the oil is subjected to a first processing (separation of oil from natural gas) before being loaded onto a ship. They may also be used as a mast for mooring and loading such a ship. Whatever the case may be, such a column is articulated to a base which is permanently installed on the water bottom and it is necessary that the operations of coupling or uncoupling between the column and its base as well as the operations of connecting the corresponding portions of the pipings pertaining to the base and the column should be carried out as rapidly as possible. This is particularly so where the working site is located in icy or arctic waters, where icebergs are frequently met. Should an iceberg drift towards the working site, the articulated column or columns must be rapidly uncoupled to prevent them from colliding with the iceberg. The improvements which the present invention has for its object allow the rapidity and reliability of such operations to be considerably improved.

With the foregoing in view, the invention relates generally to a device for coupling and uncoupling an emerging articulated column to its base installed on the bed of a body of water, the said column and the said base being provided with piping or line portions, characterized in that it comprises means for rapidly interconnecting the corresponding portions of the said pipings of the base and of the column, respectively, which are connectable and disconnectable concomitantly with the engagement and disengagement of the means of coupling and uncoupling of the said column and the said base.

In particular, where the articulated column is more especially used as a production or development unit and is therefore connected to a plurality of well-heads, the said piping portions pertaining to the column are constituted by a bundle of bending rigid pipes extending in parallel relationship to the axis of the said column. The foot of the column is provided with a connecting pedestal assembled to the said column through the medium of an articulation such as a universal joint or a Cardan joint adapted to be locked on the base. For a column of such type, the coupling and uncoupling device according to the invention, is more particularly characterized in that the cross piece of the said universal or Cardan joint being hollowed out at its centre for the passage of the said bundle, the said connecting pedestal is substantially cylindrical in shape, the said base is provided with a socket ring into which the said connecting pedestal is adapted to be fitted, and in that the said socket ring and the said pedestal are provided with mutually co-operating locking and unlocking means and with mutually co-operating means for positioning the said pedestal in predetermined angular relationship to the said socket ring.

With such a structure, a simple positioning of the connecting pedestal in the socket ring provided on the base, results in a correct angular positioning of the pedestal with respect to the socket and therefore in placing the ends of the bending rigid pipes in the required position to allow rapid connection to the other piping portions arranged on the base and communicating with the various well-heads.

Also known is another type of articulated column used more particularly for mooring and loading oil tankers and wherein the said piping portions of the base are constituted by one or two large-section lines or conduits with vertically protruding ends, whereas the corresponding piping portions of the column comprise line or conduit elements combined with the means of articulation of the said column, with respect to the base. In this case, the said line elements are themselves articulated by means of rotary joints to the said means of articulation and their ends are bent downwardly so as to be connectable to the corresponding ends of the piping portions of the base. In such type of column, the principle of the invention leads to a connection of the corresponding line elements simultaneously with the connection of the column to its base. To this end, the ends of the said line elements of the said column and/or those of the piping portions of the said base are provided with compressible annular seals (e.g. of elastomer) adapted to be compressed by a mere locking of the coupling means between the said column and the said base.

The invention will be better understood and other purposes, details and advantages thereof will appear more clearly from the following explanatory description of several forms of embodiment, according to the invention, of coupling and uncoupling devices between an articulated column and its base, given solely by way of example with reference to the appended non-limitative drawings wherein:

FIG. 2 is a view similar to that of FIG. 1, but showing the foot of the column firmly coupled to the base;

FIG. 3 is a sectional view upon III—III of FIG. 2;

FIG. 4 is a top view of the socket ring of FIG. 1, shown without the connecting pedestal;

FIG. 5 is a detailed broken-away perspective view of a portion of the socket ring indicated by arrow V of FIG. 4;

FIG. 6 illustrates a means of simultaneous connection of all the lines or conduits of the column represented in FIG. 1;

FIG. 8 is a broken-away sectional view upon VIII—VIII of FIG. 7;

FIG. 9 is an elevational view of the lower portion of another type of articulated column placed on its base;

FIG. 10 is a top view upon X—X of FIG. 9, showing the pedestal of the column articulated on the base; and FIG. 11 is a right-hand view in the direction of arrow XI of FIG. 10.

Figure 1:
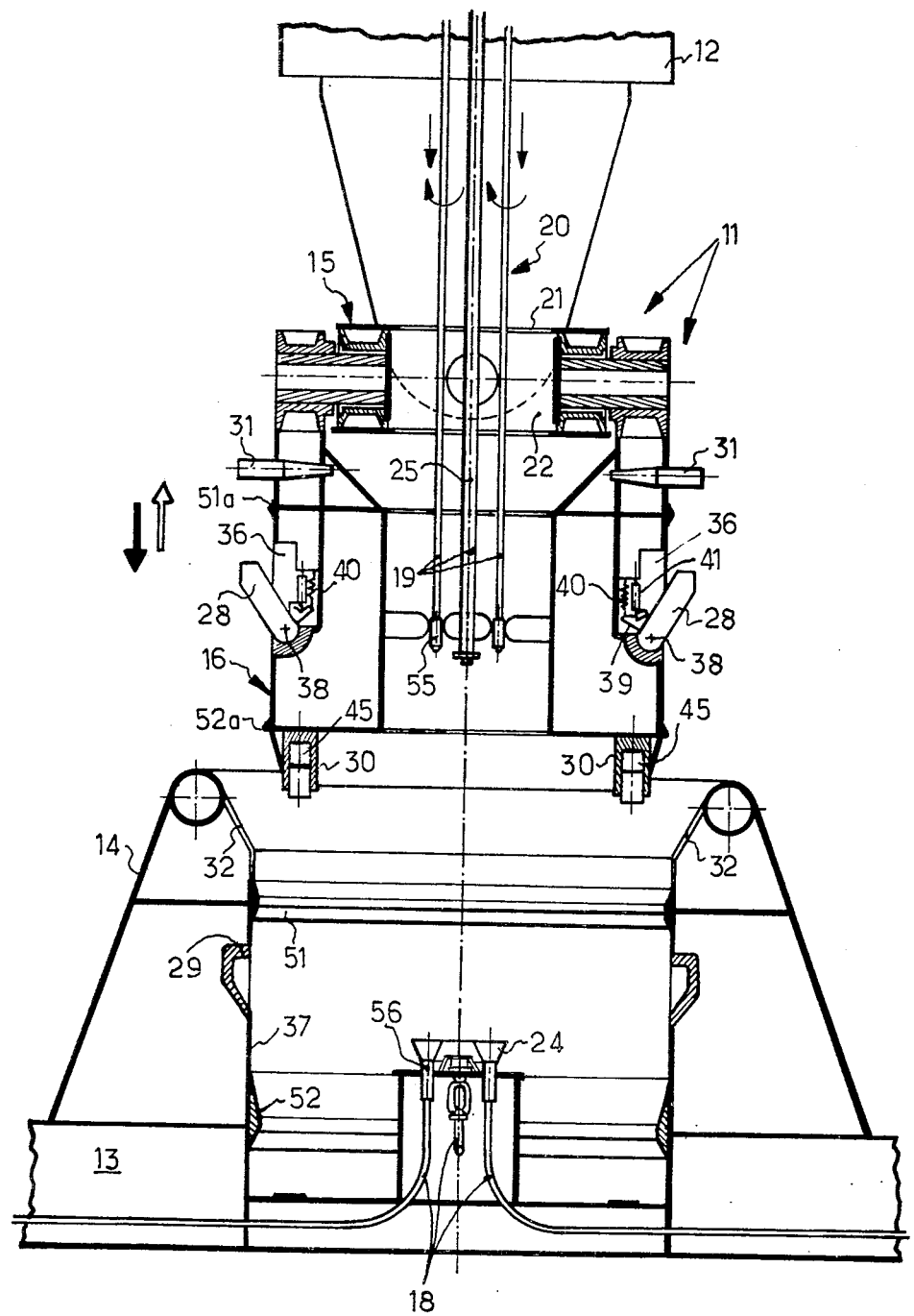
FIG. 1 is a diagrammatic sectional view of the foot of an articulated column and of a portion of its base, during one stage of coupling or uncoupling between the said column and the said base.

Referring more particularly to FIGS. 1 and 2, there is shown the foot 11 of an articulated column 12 in proximity to its base 13 installed on the bottom of a body of water and which, according to an important characterizing feature of the invention, is provided with a socket ring 14 into which the foot of the column 12 is adapted to be fitted and locked. The foot 11 of the column is essentially constituted by a universal joint 15 such as a Cardan joint connecting the column 12 to a connecting pedestal 16 substantially cylindrical in shape. Of course the pedestal 16 is so designed and dimensioned as to fit into the socket ring 14.

According to the example illustrated, a column 12 is more particularly a sea-bottom development column towards which several lines or conduits connected to respective well-heads arranged on the development site all around the base 13 converge. Thus, the base 13 and the column 12 are provided with corresponding piping portions which are connectable and disconnectable concomitantly with the operation of the coupling and uncoupling means between the column 12 and the base 13 (i.e. more precisely, between the pedestal 16 and the socket 14). The piping portions 18 of the base are gathered towards the centre of the socket ring 14 and their ends are bent upwardly so that they can be connected to the corresponding piping portions 19 of the column. In a known manner, the piping portions 19 are constituted by a bundle 20 of bending rigid pipes arranged in uniformly spaced relationship to one another along the generatrices of a fictive cylinder substantially coaxial with the axis of column 12. The bundle 20 therefore passes through the connecting pedestal 16, the cross piece 21 of the universal joint 15 being provided to that end with a central hole 22 (FIG. 8). The ends of the piping portions 18 are arranged along a circle equal in diameter to the fictive cylinder of the bundle 20 (FIG. 4) and are provided with receiving and guiding funnel-shaped terminals 24 facilitating the interconnection of the corresponding piping portions. The bundle 20 may also be provided with a central flexible pipe 25 (e.g. for conveying the gases to a flare stack located at a distance from the column 12), the end of which may be provided with a hydraulic connector 26, for example of the type designated by the trademark "Vetco" or "Cameron".

According to the invention, the socket ring 14 and the pedestal 16 are provided with mutually co-operating automatic locking and unlocking means (28, 29, 30) and mutually co-operating means (31, 32) for predetermined angular positioning of the pedestal 16 with respect to the socket ring 14. More precisely, the mutually co-operating means of angular positioning are constituted by two pins 31 secured to the pedestal 16 and radially projecting outwardly of the latter, and by corresponding notches 32 provided at the upper portion of the socket ring 14. As can be seen in FIGS. 4 and 5, where the drawn shapes of the notches are part of the invention, each notch 32 comprises a lower vertical slot 33 prolonged upwardly by a widening-out portion 34. It is readily understood that during the descent of the pedestal 16 towards the socket ring 14 (i.e. in the situation illustrated in FIG. 1), if the angular position of the pedestal with respect to the socket ring is not correct, in which case the piping portions 18 and 19 could not be interconnected, the pins 31 engage the corresponding widening portions 34 of the notches 32, thus ensuring a readjustment of the angular position of the pedestal 16 until the pins 31 are received in the vertical slots 33 defining the correct angular position of the pedestal 16. Moreover, the mutually co-operating automatic locking and unlocking means defined above comprise several pivoting latch members 28 retractable into lateral recesses 36 provided in the pedestal 16 and several corresponding engaging cavities 29 provided in the internal lateral wall 37 of the socket ring 14. Each latch 28 pivoted around a lower axis 38 is provided with an actuating lever 39 to which is connected a spring 40 tending to retain the latch 28 in the outwardly projecting position. A fluid-operated actuator 41 is also connected to the lever 39 and is simply operated when it is desired to retract the latch member 28 into its housing 36. The locking and unlocking means also comprise a certain number of damping means 30 forming counter-upthrust devices and arranged under the pedestal 16. Each damping means 30 is in fact constituted by a kind of fluid-operated actuator the working chamber 45 of which communicates with a reservoir containing a pneumatic fluid under pressure (a pneumatic accumulator known per se and which it is not deemed necessary to show in the drawings). As mentioned above, however, the damping means 30 also constitute counter-upthrust devices which, once the pedestal is placed within the socket ring 14, allow the play between the said pedestal and the said socket to be eliminated by tightly applying the latches 28 against the walls of their respective cavities 29. To this end, each damping means 30 is provided with two locking blocks or shoes 46 (FIG. 3) which are arranged in mutually confronting relationship on either side of the movable member 47 of the actuator constituting the damping means 30 and are slidable in perpendicular relationship to the direction of displacement of the movable member 47. The locking blocks 46 and the movable member 47 are provided with respective, mutually parallel contact surfaces which are slightly inclined with respect to the directions of displacement of the blocks. The latter are mounted at the ends of the rods 48 of respective fluid-operated actuators 49. It is easily understood that, owing to such a structure, the movable members 47 of the damping means 30 can bear upon the surface of the base 13, at the bottom of the socket ring 14, and thus raise the pedestal 16 until the latches 28 tightly engage the internal walls of their cavities 29.

Moreover, the internal lateral wall of the socket ring 14 is provided with two annular centering protuberances 51, 52, spaced from one another, whereas the external lateral wall of the pedestal 16 is also provided with two similar annular protuberances 51a, 52a. The protuberances 51 and 51a on the one hand, and the protuberances 52 and 52a, on the other hand, are so positioned and dimensioned as to bear against one another when the pedestal is installed within the socket. It is to be noted that the passage diameter of the upper protuberance 51 of the socket 14 is larger than the passage diameter of the lower protuberance 52 of the said socket. By "passage diameter" is understood the maximum constriction diameter of the protuberance.

For the type of column considered (and except for the flexible pipe 25) the quick-connecting means of the pipings comprise, in a manner known per se, threaded end-pieces 55 and sleeves 56 mounted at the corresponding ends, respectively, of the piping portions 19 and 18. According to an advantageous feature of the invention, the said quick-connecting means also comprise a device for simultaneous screwing of all said threaded end-pieces. This device, which is diagrammatized in FIG. 6, is located within the column 12 at an emerged upper level. It comprises driving pinions 57 secured around each rigid pipe, respectively, of the bundle 20, and a common means for simultaneous driving of the pinions 57, constituted, in the example illustrated, by an internally toothed gearwheel and meshing with all the pinions 57. The gearwheel 58 is itself connected to a rotary drive (such as a motor) in any suitable manner.

Figure 7:
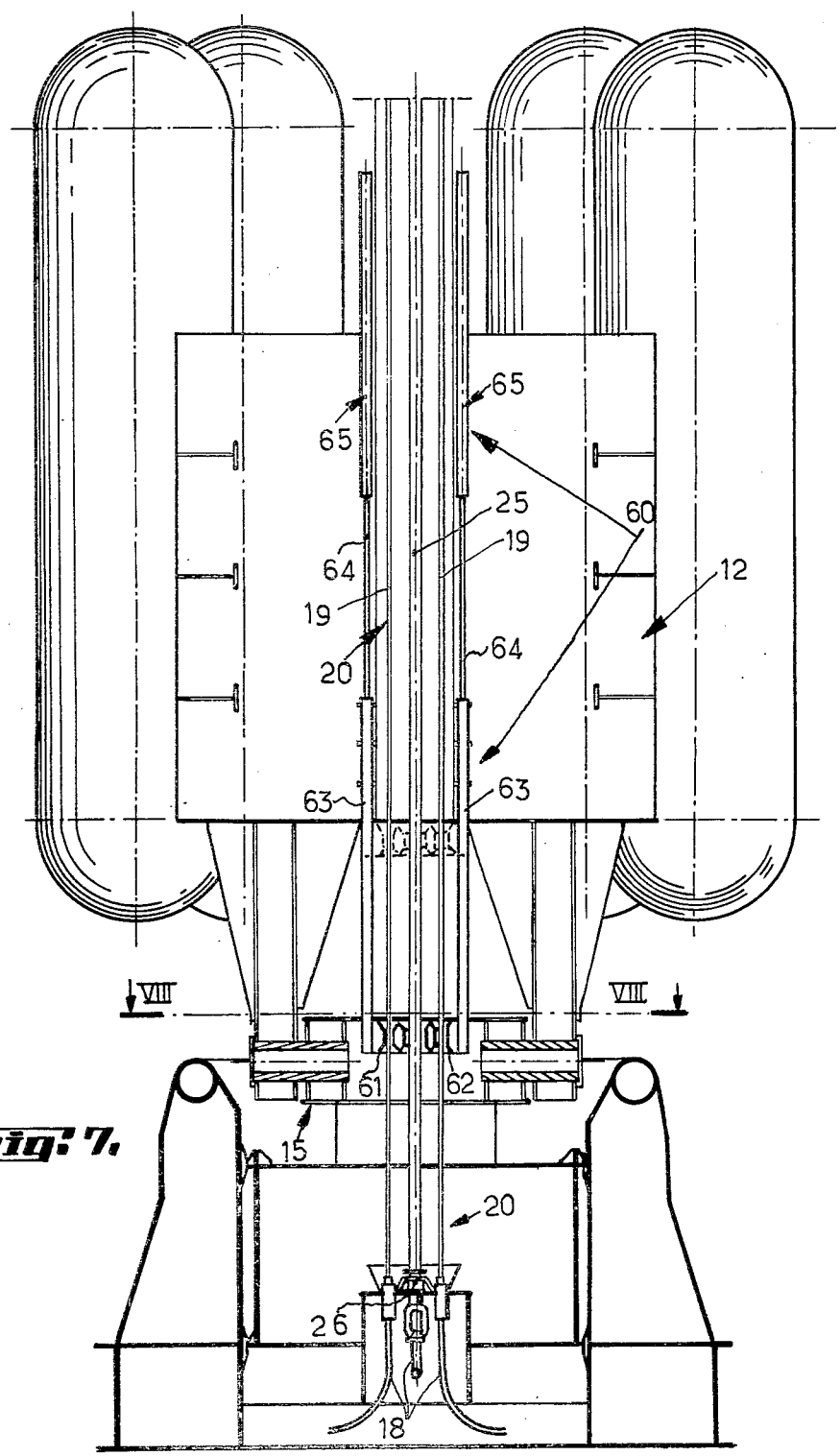
FIG. 7 is a view partially in section and to a smaller scale of the column lower portion shown articulated on its base, illustrating another improvement according to the principle of the invention.

In FIGS. 7 and 8 are shown means 60 for limiting the bending of the rigid pipes constituting the bundle 20, the function of which will be explained later. The said bend limiting means comprise a relatively thick plate 61 movable longitudinally with respect to the bending rigid pipes and provided with passage holes 62 through which the said pipes pass. The movable plate 61 is connected through the medium of extensions 63 to the rods 64 of several fluid-operated actuators 65 secured to the column 12 in parallel relationship to the bending rigid pipes of the bundle 20. In FIG. 7 the bend limiting means 60 are shown in operation, i.e. with the plate 61 lowered to its lowest level in proximity to the universal joint 15. The position of the plate 61 when the bend limiting means are not operative is shown in the same Figure in phantom lines.

The operations for connecting a column of such type to its base can be carried in the following manner. The column 12 is first lowered towards the base 13, e.g. by gradually ballasting the reservoirs incorporated in the column structure. The situation illustrated in FIG. 1 is thus progressively reached. Thereafter the pedestal 16 is fitted into the socket ring 14, being at the same time angularly positioned by the pins 31 and the notches 32 until the latches 28 are locked within their cavities 29. The annular protuberances 51, 51a and 52, 52a allow the pedestal 16 to be correctly centered and prevent the latter from being jammed or seized within the socket ring 14. Then the locking blocks or shoes of the damping means 30 are actuated by the actuators 49 to eliminate the play between the pedestal and the base. On the other hand and concomitantly, the plate 61 of the bend limiting means is lowered to the position represented in FIG. 7 to improve the reliability of the screwing of the end fittings 55 within the sleeves 56. This operation is carried out simultaneously for all the rigid pipes of the bundle 20 owing to the device shown in FIG. 6. Thereater the plate 61 of the bend limiting means is raised back and the column can be put into operation.

The column is uncoupled from its base by merely actuating the blocks 46 to their retracted position, slightly ballasting the column 12 to allow the latches 28 to be freed and retracted into the recesses 36 by actuating the actuators 41. At the same time the piping portions pertaining to the base and the column, respectively, are disconnected, so that the pedestal can be withdrawn from the socket ring 14.

Reference is now made to FIGS. 9 to 11 to describe another application of the principle of the invention for another type of articulated column. In these Figures the structures elements pertaining to the column and to its pedestal are shown in strong lines whereas the structural elements pertaining to the base are represented in phantom lines. In a column of such a type, intended more particularly for mooring and loading oil tankers, the piping portions converging towards the base are constituted only two large-section lines or conduits 70,71, the ends 70a,71a of which protrude vertically with respect to the plane of the base 13a. On the other hand, two positioning and centering bollards or the like 74 project vertically with respect to the plane of the base 13a and are adapted to engage into two corresponding hollows 73 of the pedestal 16a. The pedestal is provided with three locking bars 75 actuated by fluid-operated actuators and sliding horizontally, so as to lock the pedestal 16a when the latter is correctly positioned, towards corresponding cavity 75a provided in the base 13a. The cross piece 15a of the universal or Cardan joint is combined with line or conduit elements 76, 77 pertaining to the piping portions of the column. More precisely, some of the branches of the cross piece are hollow to ensure the continuity of the conduits and are articulated to the conduit elements 76 and 77, secured to the pedestal, through the medium of rotary joints. The ends of the said conduit elements are bent downward so as to be connectable to the ends 70a and 71a of the piping portions of the said base. According to the invention, the interconnection of the piping portions pertaining to the base and to the column takes place automatically by simply installing the pedestal 16a on the base 13a. Indeed, the ends of the conduit elements 76 and 77 (or the ends 70a and 71a of the piping portions of the base) are provided with compressible annular seals 78, e.g. of elastomer, which are therefore compressed when the pedestal 16a is simply positioned and locked on the base 13a.

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A device for coupling and uncoupling an emerging articulated column to or from its base installed on the bottom of a body of water, said column and said base each being provided with piping portions, wherein said piping portions of said column include a bundle of bending rigid pipes extending in substantially parallel relationship to the axis of said column and wherein the foot of the said column is provided with a substantially cylindrical connecting pedestal connected to the said column through an articulation such as a universal joint or a Cardan joint having a cross piece and adapted to be locked on said base, wherein the cross piece of said universal or Cardan joint has an opening formed centrally therethrough, through which opening said pipe bundle passes, said base being provided with a socket ring into which said connecting pedestal is adapted to be fitted and said column and pedestal being provided with mutually cooperating means for angular positioning said pedestal with respect to the said socket ring to a predetermined position and with mutually cooperating means for automatically locking and unlocking said socket ring to said connecting pedestal including several pivoting latch members retractable into lateral recesses provided in the said connecting pedestal and several corresponding engaging cavities provided in the internal wall of the said socket ring.

2. A device according to claim 1 wherein said mutually co-operating angular positioning means are constituted by at least two pins secured to said connecting pedestal and protruding radially outwardly thereof and by corresponding notches provided at the upper portion of the said socket ring, each said notch being constituted by a lower vertical slot extended upwardly by a widening-out portion.

3. A device according to claim 1 wherein said mutually co-operating means for automatically locking and unlocking also include damping means constituting counter-upthrust or counter-buoyancy devices arranged under the said pedestal and serving to eliminate the play or relative motion between the said pedestal and the said socket by tightly applying the said latch members to the interior of their respective cavities.

4. A device according to claim 3 wherein each damping means is substantially in the form of a fluid-operated actuator, the working chamber of which communicates with a reservoir for the supply of pneumatic fluid under pressure and wherein said damping means is provided with at least one locking block or shoe preventing the extension of the said damping means, said locking block or shoe being actuated by a fluid-operated actuator and adapted to slide in perpendicular relationship to the direction of displacement of the said movable member of the said actuator constituting the damping means, the said block and the said movable member being provided with parallel, mutually contacting surfaces slightly inclined with respect to the direction of displacement of the said block.

5. A device according to claim 4 wherein each damping means is provided with two locking blocks or shoes arranged in mutually confronting relationship at each side of the said movable member of the said actuator constituting the damping means.

6. A device according to claim 1 wherein the internal lateral wall of the said socket ring and the external lateral wall of the said connecting pedestal are each provided with two annular centering protuberances spaced from one another, each annular protuberance of the said pedestal being so arranged as to bear against one of the annular protuberances of the said socket ring when the said pedestal is installed in the said socket ring, and wherein the passage diameter of the upper protuberance of the said socket ring is greater than the passage diameter of the lower protuberance of said socket ring.

7. A device according to claim 1 further including threaded end fittings and sleeves provided at the corresponding ends of the said piping portions of the said column and of the said base, and wherein the bending rigid pipes of the said bundle are arranged in uniformly spaced relationship along the generatrices of a fictive cylinder substantially coaxial with the axis of the said column, and further including a device for simultaneous screwing of all the said threaded end-fittings comprising driving pinions mounted respectively around each rigid pipe, and common means for driving the said pinions, e.g. an internally toothed gearwheel meshing with all the said driving pinions and itself mechanically connected to rotary drive means such as a motor.

8. A device according to claim 1 further including means for limiting the bending of the said rigid pipes.

9. A device according to claim 8 wherein said bend limiting means comprise a plate movable longitudinally with respect to the said bundle and provided with holes for the passage of the said rigid pipes of the said bundle, respectively, the said movable plate being connected to the movable member of at least one fluid-operated actuator secured to the said column in parallel relationship to the said bending rigid pipes.

* * * * *